US005870671A

United States Patent [19]
Martinez

[11] Patent Number: 5,870,671
[45] Date of Patent: Feb. 9, 1999

[54] TIME CONTROL SYSTEM FOR A CELLULAR TELEPHONE

[76] Inventor: Andy Martinez, 10839 N. Snapper Creek Dr., Miami, Fla. 33173

[21] Appl. No.: 556,487

[22] Filed: Nov. 13, 1995

[51] Int. Cl.[6] .................................................. H04Q 7/34
[52] U.S. Cl. ............................................ 455/409; 455/406
[58] Field of Search ............................... 379/58, 59, 111, 379/112, 114, 131, 133, 144, 132, 142; 455/33.1, 405, 406, 407, 408, 409

[56] References Cited

U.S. PATENT DOCUMENTS

| | | | |
|---|---|---|---|
| 4,122,308 | 10/1978 | Weinberger | 379/114 |
| 4,264,956 | 4/1981 | Delaney | 379/112 |
| 4,706,275 | 11/1987 | Kamil | 379/144 |
| 4,920,556 | 4/1990 | Wong | 379/131 |
| 4,924,499 | 5/1990 | Serby | 379/200 |
| 4,942,559 | 7/1990 | Fleck | 379/142 |
| 5,062,134 | 10/1991 | Laird | 379/131 |
| 5,164,923 | 11/1992 | Avis | 379/59 |
| 5,325,418 | 6/1994 | McGregor et al. | 379/59 |
| 5,388,148 | 2/1995 | Seiderman | 379/59 |
| 5,436,957 | 7/1995 | McConnell | 379/88 |
| 5,438,612 | 8/1995 | Norimatsu | 379/58 |
| 5,440,621 | 8/1995 | Castro | 379/112 |
| 5,442,553 | 8/1995 | Farrillo | 364/424.04 |
| 5,446,783 | 8/1995 | May | 379/59 |
| 5,448,765 | 9/1995 | Kovanen et al. | 455/90 |
| 5,454,033 | 9/1995 | Hahn | 379/198 |
| 5,528,667 | 6/1996 | Steffensen | 379/59 |
| 5,559,871 | 9/1996 | Smith | 379/144 |
| 5,563,934 | 10/1996 | Eda | 379/144 |
| 5,577,100 | 11/1996 | McGregor | 379/58 |
| 5,612,682 | 3/1997 | DeLuca | 379/57 |

FOREIGN PATENT DOCUMENTS 4198545  4/1980  United Kingdom .................. 379/132

OTHER PUBLICATIONS

Product Overview, Making Cellular Renting Your Business All in Communications/ Oct. 1993 pp. 24–27.

*Primary Examiner*—Dwayne D. Bost
*Assistant Examiner*—Brian L. Johnson
*Attorney, Agent, or Firm*—Oltman, Flynn & Kubler

[57] ABSTRACT

In accordance with the invention there is provided a time control system for a cellular telephone having a control circuit, which includes an external control having a timing input arrangement for receiving use-time available to a user of the cellular telephone, an interface box connected with the external control detachably connected with the cellular telephone, an interface transmission module in the interface box, an internal data transmission circuit in the cellular telephone, a disconnectable transmission arrangement disposed between the interface transmission module and the internal transmission circuit, an internal timing control circuit in the cellular telephone having a timing storage arrangement for storing use-time available to the user of the cellular telephone, the cellular telephone control circuit having a disabling input connected with the internal timing control arrangement for disabling the cellular telephone upon expiration of use-time stored in the timing storage arrangement.

13 Claims, 3 Drawing Sheets

TIME CONTROL SYSTEM FOR A CELLULAR TELEPHONE

The invention relates to a time control system for a cellular telephone for use under conditions wherein an owner of the cellular telephone needs means for limiting the use time available to a user of the cellular telephone.

BACKGROUND OF THE INVENTION

With the increasing popularity of cellular telephones, it has become practical for various businesses, e.g. car rental businesses and the like, to offer cellular telephones for rent, for example in connection with a car rental transaction. Since use of a cellular phone is paid for in accordance with special tariffs that are considerably higher than tariffs for conventional telephones, it can happen that a renter of a cellular telephone runs up a phone bill of considerable magnitude. It also frequently happens that cellular telephones are stolen from the rented vehicle, and that the thief runs up a very high telephone bill for which the owner of the cellular phone is responsible.

It is accordingly a primary object of the instant invention to provide a time control system for cellular telephones which limits the time available to the user of the phone to some preset length of time as agreed upon by the user and owner of the phone.

Applicants are unaware of any prior art relating to the invention disclosed herein.

Further objects and advantages of this invention will be apparent from the following detailed description of a presently preferred embodiment which is illustrated schematically in the accompanying drawings.

SUMMARY OF THE INVENTION

In accordance with the invention there is provided a time control system for a cellular telephone having a control circuit, which includes an external control having a timing input arrangement for receiving use-time available to a user of the cellular telephone, an interface box connected with the external control detachably connected with the cellular telephone, an interface transmission module in the interface box, an internal data transmission circuit in the cellular telephone, a disconnectable transmission arrangement disposed between the interface transmission module and the internal transmission circuit, an internal timing control circuit in the cellular telephone having a timing storage arrangement for storing use-time available to the user of the cellular telephone, the cellular telephone control circuit having a disabling input connected with the internal timing control arrangement for disabling the cellular telephone upon expiration of use-time stored in the timing storage arrangement According to the invention there is further provided a time control system wherein the disconnectable transmission arrangement includes mutually communicating spaced apart pairs of infra-red light-emitting diodes and infra-red-sensing photo diodes, or wherein the disconnectable transmission arrangement includes mutually communicating spaced apart pairs of sliding contacts, or wherein the disconnectable transmission arrangement includes mutually communicating spaced apart pairs of inductive coupling coils.

According to a further feature, the time control according to the invention includes a personal computer in the external control, and a keyboard connected to the personal computer for entering the use-time, and further an RS-232 data connection between the external control and the interface box.

The time control system according to the invention may include in the internal timing control circuit a time counter circuit for storing the use-time, a clock circuit connected to the counter circuit for providing timing clock pulses to the counter, and a counter control circuit connected to the counter circuit and to the clock circuit for controlling the time counter circuit.

The inventive concept may further include a time control system wherein the cellular telephone control circuit has a roaming output, the roaming output being connected to the timing arrangement for modifying the use-time available by a given factor in response to an on-signal on the roaming output, wherein the given factor is equal to zero, or equal to ½, or wherein the given factor is selectable.

The time control system according to the invention may optionally include an external control having a test input operative for setting the time control system to a test mode, wherein the central control includes a test display arrangement and an arrangement for transmitting a test signal from the internal timing control circuit to the test display arrangement via the intermediary of the internal data transmission circuit, the disconnectable transmission arrangement, the interface transmission module and the external control.

The time control system according to the invention may include a time clock in the internal timing control, wherein the test signal is generated by the time clock, and optionally the test signal is a one second pulse.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DESCRIPTION OF THE PREFERRED EMBODIMENTS

Figure 1:
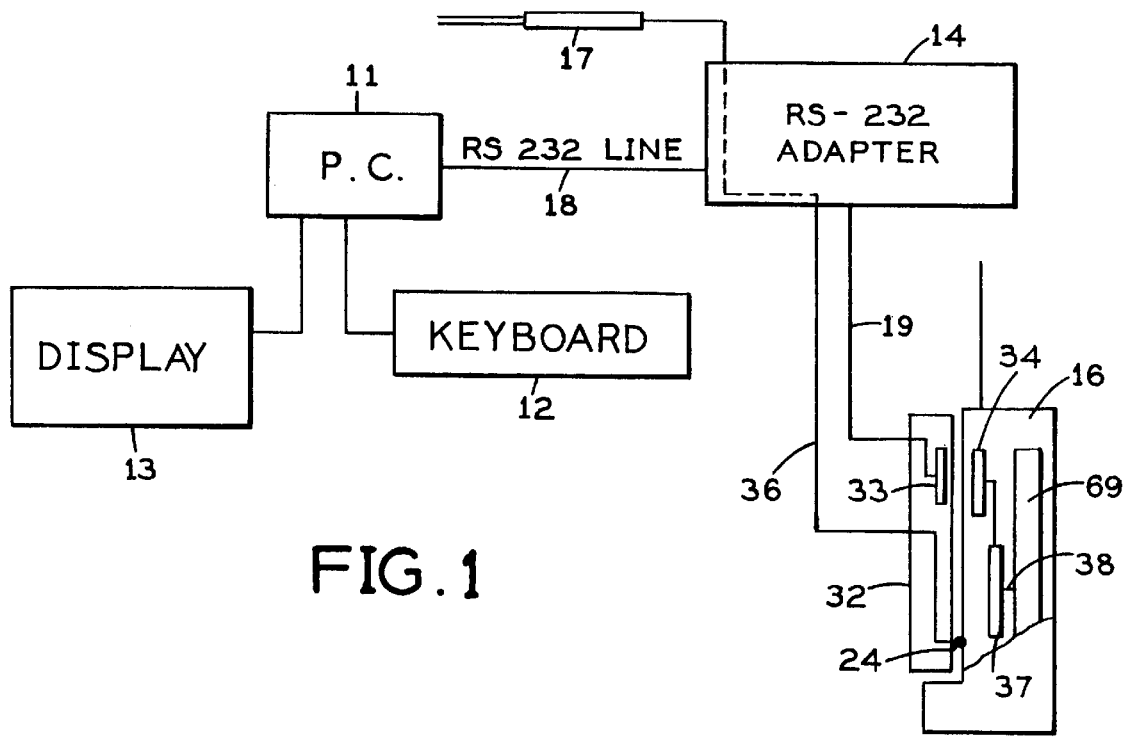
FIG. 1 is a block diagram of the basic building blocks of the invention.

The basic components of the system are shown in FIG. 1, wherein a timing control system is composed of a personal computer PC 11 to which is connected in conventional manner a display 13, e.g. in the form of a computer monitor, and a keyboard 12, by means of which various control commands are entered manually to the cellular phone. Such commands can include start-up, entry of use-time available to the user of the cellular phone 16, roaming and test commands. The computer is connected to the cellular phone via a conventional serial interface, such as a conventional RS-232 adapter 14, as is well known for connecting personal computers to a device arranged to receive and transmit data from and to the personal computer 11. Power for the RS-232 adapter is provided by way of a power plug 17 inserted into a power supply, not shown.

The RS-232 adapter 14 is connected via an RS-232 line 18 to a serial port of the computer 11 and via a two-way data line 19 to an interface box 32 which provides a data connection with the cellular phone 16, during programming of the phone.

Figures 2, 3:
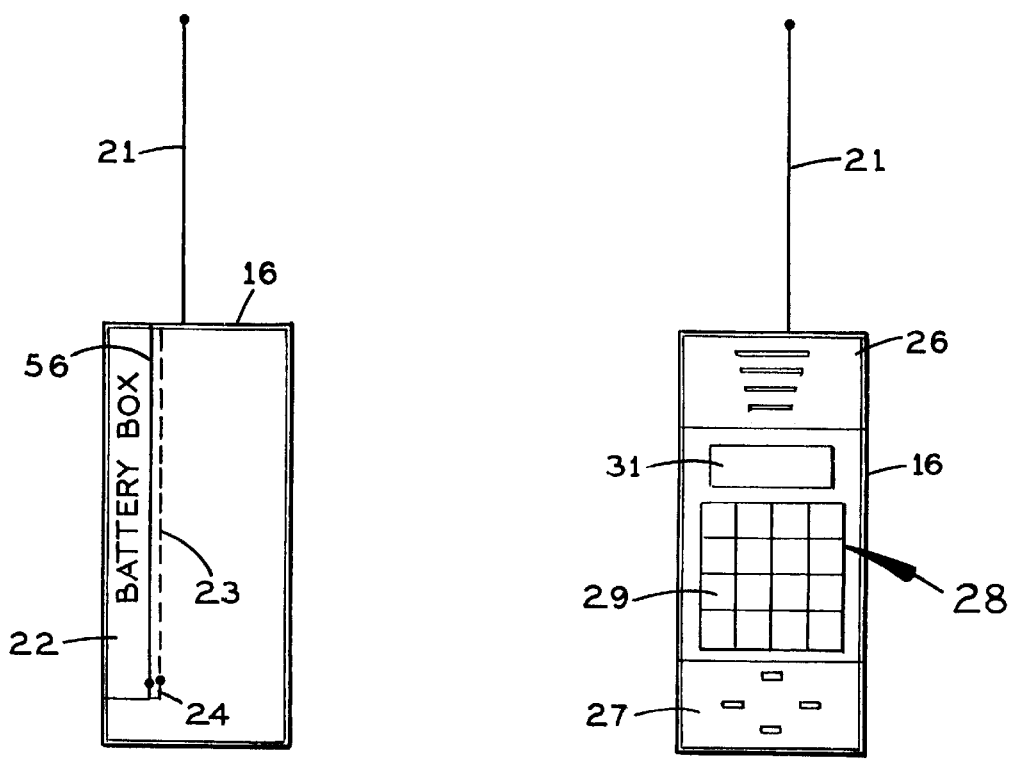
FIG. 2 is a side elevational view of a cellular telephone showing the telephone body and a battery box attached thereto.
FIG. 3 is a front elevational view of a cellular telephone showing the main appearance of a typical phone.

Before describing details of the phone data connection, the general structure of a cellular phone will be described in reference to FIGS. 2 and 3, wherein FIG. 2 is a side elevational view of the phone 16 proper, which has a conventional antenna 21 connected thereto. As is conventional, the phone 16 is powered by a detachable battery box 22 containing rechargeable storage batteries. The battery box 22 is conventionally connected to phone 16 by means of slide rails that match complementary slide rails in the phone body 16, indicated symbolically by a phantom line 23. The battery box 22 has at its bottom end a set of slide contacts 24 that provide transfer of power from the storage battery to the circuit of the cellular phone.

FIG. 3 is an elevational front view of a conventional cellular phone 16, which has at its upper end a receive transducer 26 which couples to a user's ear, and a transmit transducer 27, which transmits the user's voice to the phone. A key pad 28 is composed of a number of dial keys and various function keys which are provided for various control functions for the phone, such as power-on, entry of the called number, start sending, end-of-sending, recall, clear entry and so-forth, which are well known from conventional cellular phones. A display 31 is provided to give the user various messages such as the number dialled, low-battery status and so forth.

Returning now to FIG. 1, a data connection from the RS-232 adapter 14 is made by means of an interface box 32 that is geometrically similar to the battery box 22 in that it has slide rails that allow the interface box 32 to be inserted in the place of the battery box 22.

The interface box 32, when attached to the phone 16, provides a data connection to the phone by means of a disconnectable data transfer arrangement composed of, for example, an infra-red transmitter-receiver 33 in the interface box 32 which is optically coupled to a corresponding internal infra-red transmitter-receiver 34 in the cellular telephone 16.

The interface box 32 is equipped with battery slide contacts 24 identical to the contacts 24 in the battery box 22, so that power can be supplied to the cellular phone via power lead 36, connected to the power plug 17, during the time when data are transmitted to an internal timing control circuit 37 installed in the phone.

Figure 4:
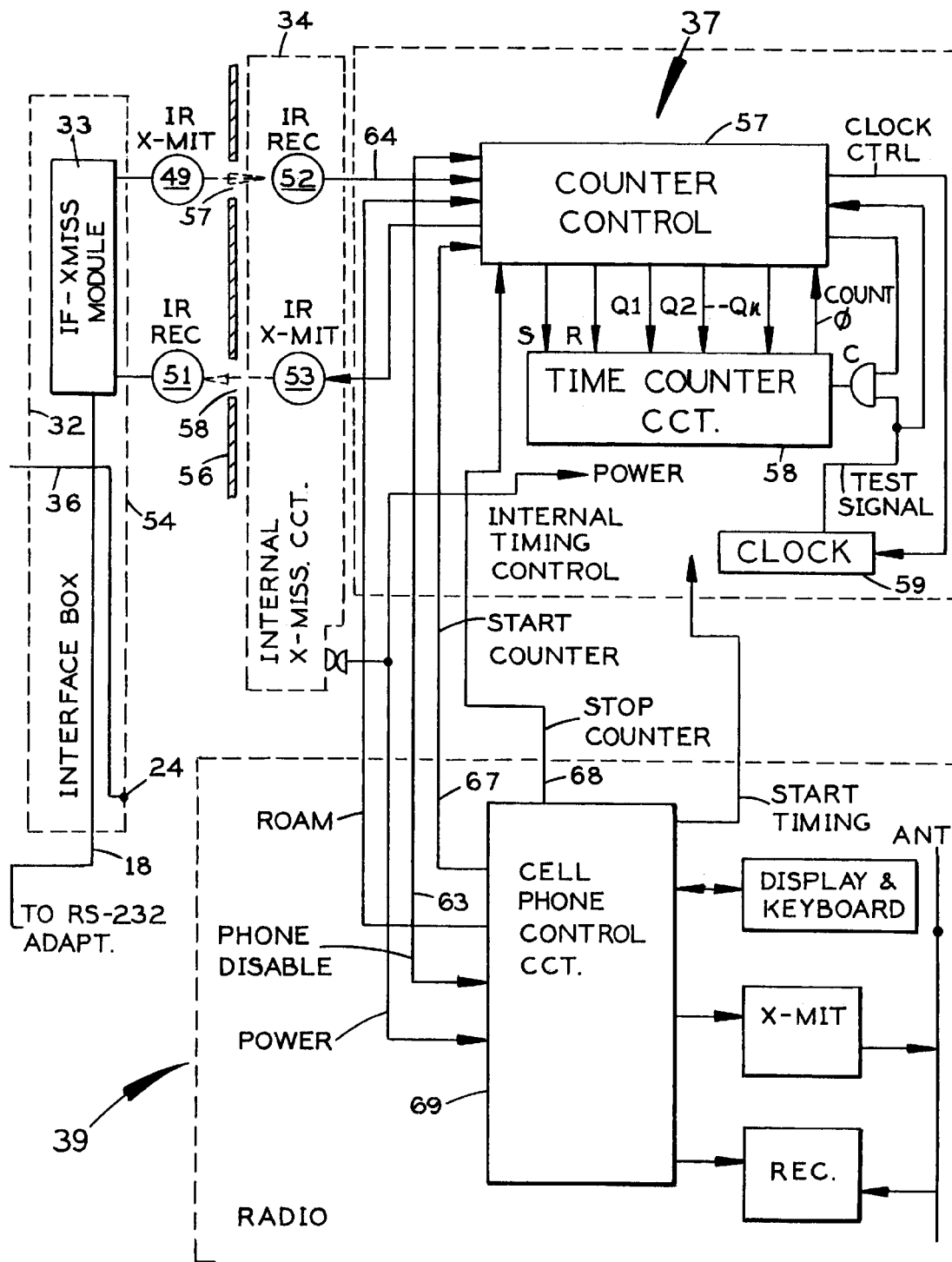
FIG. 4 is a more detailed diagram of the invention showing its various parts.

The internal timing control circuit 37 is connected via a multi-lead connection 38 to the circuits 39 of the cellular phone, as shown in more detail in FIG. 4.

In FIG. 4 the interface box 32 is seen containing the interface transmission module 33, which has on an exterior wall 54 facing the back-wall 56 of the cellular phone an infra-red transmit light-emitting diode 49, and an infra-red receive photo diode 51. The back wall 56 of the cellular phone which normally faces the battery box has two windows, i.e. small light openings 57,58 respectively, aligned with the infra-red transmitter 49, and the infra-red receiver 51. Inside the phone, an internal transmission circuit 34 is equipped with an infra-red receive photo diode 52 and an infra-red transmit diode 53, respectively aligned with light openings 57 and 58, so that a two-way data transmission can be established between the two pairs of infra-red diodes 49,52, and 51,53 in a manner well known from infra-red controls widely used in household appliances and the like.

It follows that the two-way connection could be established by other means such as mating slide contacts, coupled pairs of capacitor plates, or coupled pairs of inductors. Infrared transmission has the advantages of being small, reliable and relatively inexpensive.

The pair of infrared diodes 52,53 are connected to a respective data input and data output of a counter control circuit 57. The counter control circuit 57 controls a time counter circuit 58 which during use is driven in reverse from a preset allowed use-time by a clock 59 that transmits e.g. one second pulses.

In operation the time control system operates as follows, as illustrated diagrammatically in FIGS. 4 and 5:

When a cellular phone 16 is to be programmed to store a use-time of e.g. three (3) hours of allowed use time, the battery box 22 of the phone is removed and replaced by the interface box 32, which provides a two-way data connection between the PC 11 and the cellular phone 16 via the RS-232 line 18, the RS-232 adapter 14, interface box 32, the interface transmission module 33, the internal transmission circuit 34 and the counter control 57.

The allowed use-time is entered from the PC keyboard 12, e.g. in hours and fractions thereof. The computer converts the use-time to a corresponding number of e.g. minutes in e.g. hexadecimal notation. This number is transmitted to the counter control circuit 57 and stored there in non-volatile, e.g. EEPROM memory cells 61, and in addition a roaming code may be transmitted to a roaming code memory 62, also formed of EEPROM cells to instruct the internal timing control 37 on how to handle roaming.

Roaming charges, which apply whenever the cellular phone is outside its home area are always greater than the airtime used in the home area. Airtime billed during roaming may be reverse counted as e.g. double the number of minutes spent in the home area, or may be disallowed completely, in which case the phone will be rendered inoperative during roaming. Alternatively, roaming time may be reverse counted in minutes multiplied by some factor embedded in the roaming code such as, for example, a factor equal to three. The time counter circuit 58 is set to a use-time number or factor, and counted down, e.g. at one minute counts until it reaches zero count, at which time the phone is disabled via a phone disable lead 63.

Figure 5:
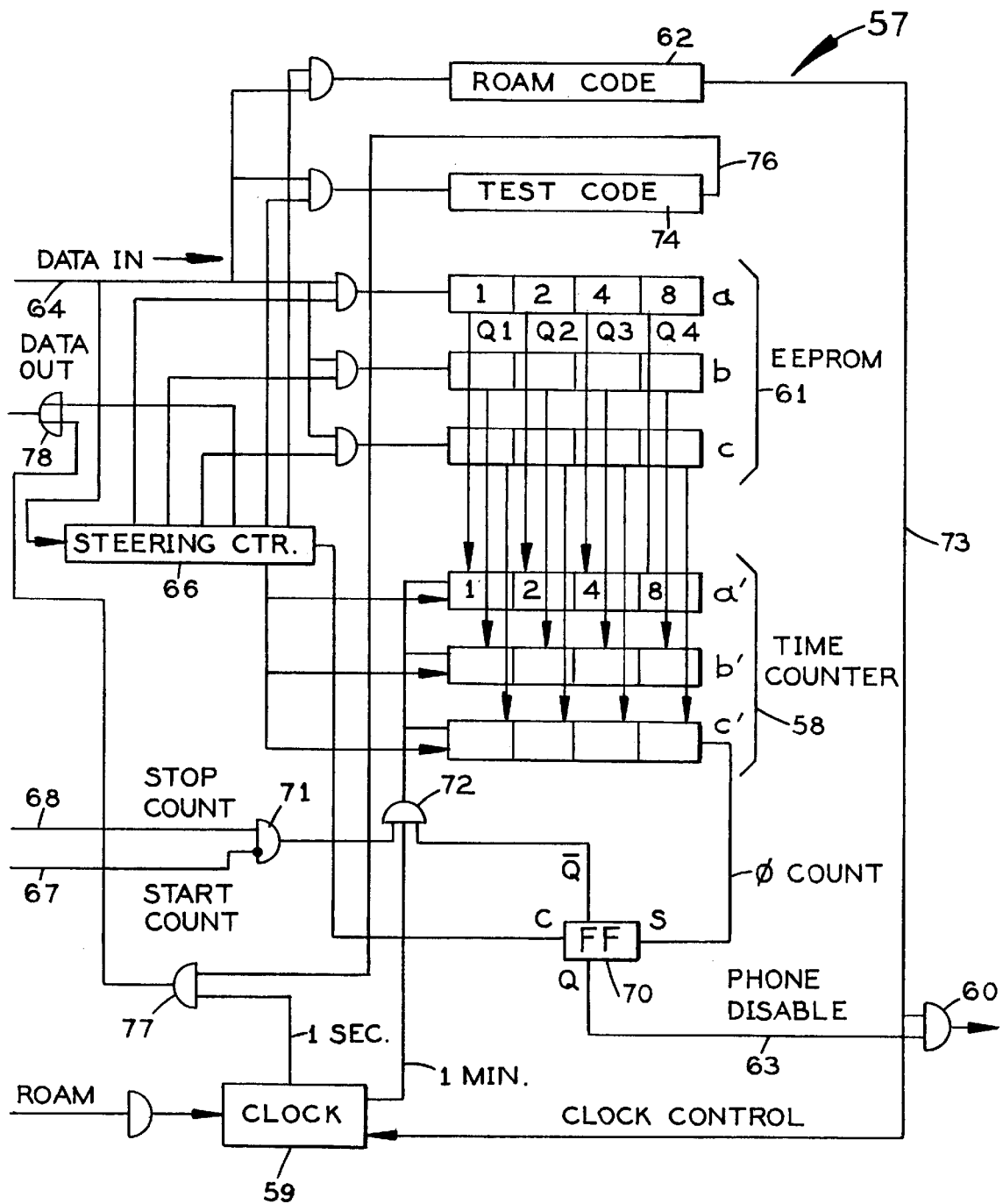
FIG. 5 is a circuit diagram showing circuit details of the counter control part of the invention.

FIG. 5 shows in diagrammatic form further details of the counter control 57 and the time counter 58.

Data from the PC 11 enters on the data-in lead 64 from the internal transmission circuit 34. The use-time data are stored as digits in the EEPROM 61, composed of three digit sections a, b and c.

The digits are steered into their respective digit sections a, b, and c by a steering counter, which is incremented by steering data on the data-in lead 64. When all digits are in their respective EEPROM cells the cellular phone is turned on, at which time the adapter box 32 is replaced by the battery box 22. During replacement, power to the phone is momentarily lost, but the EEPROM cells retain their stored data. When the battery box 22 is inserted the stored data are transferred into the time counter 58 composed of counter units a', b', and c'. The details of the transfer circuit and other circuit details which are obvious to a person of ordinary skill are not shown for the sake of clarity.

During use of the phone, the time counter 58 is next counted down at one (1) minute intervals under control of startcount lead 67, and stop-count lead 68 whenever the cellular phone is in airtime mode, i.e. in active connection with the cellular network. These functions are available from the cellular phone control circuit 69. The start count lead 67 and stop count lead 68 are connected to AND-gate 71, which controls the down counting of time counter 58 via AND-gate 72, which is also controlled by time pulses, e.g. one (1) minute pulses from clock 59 and from the inverted output $\overline{Q}$ of a flip-flop 70. This flip-flop 70 remains set and keeps the cellular phone disabled until it is again reset when the next user has the phone programmed for use-time, and the new use-time is entered into EEPROM 61, and the steering counter 66 is again advanced to the point wherein the flip-flop is reset at its clear input C, making the phone ready for the next user.

In case a roam command is entered with the input data, the roam-code is entered into the roam-code memory 62, which is connected via lead 73 with the clock 59. Depending upon the entered roam-code, the clock 59 may be set to generate e.g. ½ minute pulses instead of one (1) minute pulses, so that the counter 58 will be counted down at twice the no roaming rate. The roam-code may alternatively be arranged to disable the phone on disable lead 63 during roaming by connecting clock control lead 73 with the phone-disable lead 63 by means of an OR-gate 60.

At the end of programming the time counter 58, a test code may be entered from computer PC 11 on data-in lead 64 and stored in test code memory 74. The test code memory output lead 76 enables an AND-gate 77 which gates out one (1) second pulses to the data-out lead via an OR-gate 78. The gated-out one second pulses are received on the PC 11, where they can be displayed on one track on the monitor 13, and compared with another track of one (1) second pulses from the crystal-controlled computer clock to verify that the clock is running accurately and that the user will get accurately the use-time for which he contracted.

I claim:

1. A time control system for a cellular telephone having a control circuit, comprising an external control having time units input means for receiving units of use-time available to a user of the cellular telephone, an interface box connected with the external control detachably connected with the cellular telephone, an interface transmission module in said interface box, an internal data transmission circuit in the cellular telephone, disconnectable transmission means disposed between said interface transmission module and said internal transmission circuit, an internal control circuit in said cellular telephone having time units storage means for storing time units available to the user of the cellular telephone, said cellular telephone control circuit having a disabling input connected with said internal time units storage means for disabling said cellular telephone upon expiration of the use-time stored in said time units storage means; and including in said internal time units storage means a time unit counter circuit for storing said units of use-time, a clock circuit connected to said time unit counter circuit for providing time units to said time unit counter circuit, and a counter control circuit connected to said time unit counter circuit and to said clock circuit for controlling said time unit counter circuit.

2. A time control system for a cellular telephone having a control circuit, comprising an external control having timing input means for receiving use-time measured in time units available to a user of the cellular telephone, an interface box connected with the external control detachably connected with the cellular telephone, an interface transmission module in said interface box, an internal data transmission circuit in the cellular telephone, disconnectable transmission means disposed between said interface transmission module and said internal transmission circuit, an internal timing control circuit in said cellular telephone having timing storage means for storing time units available to the user of the cellular telephone, said cellular telephone control circuit having a disabling input connected with said internal timing control circuit for disabling said cellular telephone upon expiration of the time units stored in said timing storage means, and wherein said disconnectable transmission means include at least one of mutually communicating spaced apart pairs of infra-red-sensing photo diodes, mutually communicating spaced apart pairs of sliding contacts, and pairs of coupling coils.

3. A time control system according to claim 1, including a personal computer in said external control, and a keyboard connected to said personal computer for entering said time units.

4. A time control system according to claim 1, including an RS-232 data connection between said external control and said interface box.

5. A time control system according to claim 4, including an RS-232 data adapter in said RS-232 data connection.

6. A time control system according to claim 2, including in said internal timing control circuit a time counter circuit for storing said use-time measured in time units, a clock circuit connected to said counter circuit for providing time units to said counter, and a counter control circuit connected to said counter circuit and to said clock circuit for controlling said time counter circuit.

7. A time control system according to claim 1, wherein said cellular telephone control circuit has a roaming output, said roaming output being connected to said means for modifying the use-time available by a given factor in response to an on-signal on said roaming output.

8. A time control system according to claim 7, wherein said given factor is equal to zero.

9. A time control system according to claim 7, wherein said given factor is equal to ½.

10. A time control system according to claim 9, wherein said given factor is selectable.

11. A time control system according to claim 6, wherein said external control has a test input operative for setting said time control system to a test mode, wherein said external control includes test display means, and means for transmitting a test signal from said internal timing control circuit to said test display means via the intermediary of said internal data transmission circuit, said disconnectable transmission means, said interface transmission module and said external control.

12. A time control system according to claim 11, including a time clock in said internal control circuit, wherein said test signal is generated by said time clock.

13. A time control system according to claim 12, wherein said test signal is a one second pulse.

* * * * *